3,121,022
CHEMICALLY DEPOSITED LEAD SELENIDE
PHOTOCONDUCTIVE CELLS
Harry E. Spencer, Rochester, N.Y., assignor to Eastman Kodak Company, Rochester, N.Y., a corporation of New Jersey
No Drawing. Filed Feb. 25, 1957, Ser. No. 642,319
5 Claims. (Cl. 117—215)

This invention relates to photoconductive cells. In one of these specific aspects, this invention relates to improved lead selenide photoconductive cells protected against reduction in photosensitivity upon exposure to the atmosphere.

Procedures for the production of both lead sulfide and lead selenide photoconductive cells are already known in the art. The procedures employed to form such photoconductive cells have been either of the chemical deposition type or of the vacuum evaporation procedure. This invention is directed primarily toward improving lead selenide cells prepared by chemical deposition procedures.

Lead selenide photoconductive cells suffer from the disadvantage of being adversely affected by exposure to the atmosphere. When such lead selenide cells are exposed to air, drastic reductions in the photosensitivity of the cells have been observed. In the past, this disadvantage of such cells has been overcome by placing the lead selenide cells in hermetically-sealed tubes or containers immediately after production. It is the purpose and object of this invention to provide lead selenide photoconductive cells that are protected against undesirable reduction in photosensitivity when exposed to the atmosphere and to avoid the necessity of storing said cells in specially prepared sealed containers for protection against loss of photosensitivity.

In accordance with this invention, it has been found that lead selenide photoconductive films or layers can be protected from undesirable losses in photosensitivity by a layer of lead sulfide that insulates the lead selenide layer from exposure to and contact with the atmosphere.

The lead selenide photoconductive cells to be protected in accordance with this invention can be produced by the procedure described in the copending application of Spencer and Morgan, Serial No. 642,318, filed February 25, 1957. In accordance with this procedure, an aqueous solution of an alkali metal hydroxide such as sodium hydroxide is formed and a lead salt such as lead nitrate is added to the alkaline solution. The resulting mixture is maintained at a temperature of 5 to 40° C. A second solution of alkali metal hydroxide is prepared and an alkali metal arsenite, such as sodium arsenite, is added to the second alkaline solution. Immediately prior to the start of the reaction forming the lead selenide, a derivative of selenourea, such as N,N-dimethylselenourea, is added to the alkaline solution containing the alkali metal arsenite. The two solutions are then mixed immediately and the resulting mixture is poured into containers in which glass slides or other suitable substrates have been placed. In a period of about 3 to 15 minutes, the formation and deposition of lead selenide on the glass plates has proceeded to a point where the deposition can be terminated. The reaction mixture is poured from the containers and the glass slides containing the lead selenide deposits are rinsed with water. The lead selenide layer thus produced has a thickness of the order of 0.1 micron.

Immediately after formation of the lead selenide photoconductive cells, the layers of lead selenide are protected from exposure to the atmosphere by depositing a layer of lead sulfide thereon preferably while the lead selenide films are still wet with wash water. The lead sulfide protective overlayer can be deposited on the lead selenide film by immersing the substrate containing the lead selenide film in a suitably prepared solution of lead sulfide. In order to prepare the lead sulfide solution, an aqueous solution of an alkali metal hydroxide, such as sodium hydroxide, is prepared and a lead salt, such as lead nitrate in water, is added to the alkaline solution. In place of lead nitrate, other lead salts, such as lead acetate, lead chlorate and lead perchlorate can be used. The lead nitrate solution and sodium hydroxide solution can have concentrations of 0.0027 molar and 0.032 molar respectively. If desired, an aqueous solution of cupric nitrate having a concentration of 0.00169 molar can be added to the alkaline solution. A second solution of alkali metal hydroxide, such as sodium hydroxide, is prepared and thiourea is added to this second alkaline solution. If desired, such compounds as sodium sulfite, sodium bisulfide or sodium metabisulfite can be added to the second alkaline solution. The two solutions are mixed and maintained at a temperature within the range of 5 to 40° C. At first, the resulting mixture is amber in color, but after a period of about 10 minutes, the mixture turns brown and finally black. After a period of about 10 to 12 minutes, the glass plate or other substrate containing the lead selenide layer or film is placed in the lead sulfide-containing solution. The glass plate is placed in the solution in such a way that it forms a small angle with the bottom of the container for the lead sulfide solution and the surface of the glass plate containing the lead selenide film faces the bottom of the container. After a period of about 20 to 25 minutes, the lead sulfide solution is poured from the container and the glass slide is thoroughly rinsed with water. The lead sulfide layers thus deposited have a thickness of the order of 0.1 micron. The resulting photoconductive cells are then dried and, if desired, electrodes are placed on them. Also the photoconductive layer can be scraped to the desired size.

The photoconductive layers of lead selenide protected in accordance with this invention can be exposed to the atmosphere for extended periods of time, without substantial reduction in the photosensitivity of the cells.

The following example is illustrative of this invention:

*Example*

The following solutions for the production of lead sulfide are prepared:

Solution 1—
    15 cc. distilled water
    30 cc. 0.00169 molar $Cu^{++}$ (cupric nitrate)
    25 cc. 3.5 molar $OH^-$ (sodium hydroxide)
    25 cc. 0.3 molar $Pb^{++}$ (lead nitrate)
    15 cc. 3–A denatured alcohol Solution 2—
    2.5 g. thiourea
    0.25 g. sodium metabisulfite
    25 cc. $H_2O$ The solutions are mixed and placed in a water bath maintained at a temperature of 23° C. The glass plate containing a freshly prepared layer of lead selenide is inserted in the reaction mixture after the reaction-forming lead sulfide has been carried on for about 10 minutes. After about 20 minutes, the glass plate containing lead selenide protected by a layer of lead sulfide is removed from the reaction mixture and washed with water.

In place of thiourea in the lead sulfide precipitating solutions described above, derivatives of thiourea, such as allyl thiourea and the like, can be used.

The photoconductive cells prepared in accordance with this invention are composed of lead selenide protected by an overcoating of lead sulfide. The cells are actually four-phase systems with two crystalline layers of mixtures of lead selenide and lead sulfide between the lower layer of lead selenide and the upper layer of lead sulfide. The lower layer of each photoconductive cell is composed of crystalline lead selenide, and the upper layer is composed of crystalline lead sulfide. At the interface of the lower and upper layers there have been found two separate phases containing crystalline mixtures of lead selenide and lead sulfide. The mixed phase adjoining the lead selenide layer contains up to about 20 mol. percent lead sulfide and the mixed phase adjoining the lead sulfide layer contains up to about 20 mol. percent lead selenide.

I claim:

1. The method for protecting lead selenide photosensitive cells from undesirable loss of photosensitivity upon exposure to the atmosphere which comprises depositing a protective layer of lead sulfide on and in contact with the surface of said lead selenide.

2. The method for protecting lead selenide photosensitive cells from undesirable loss upon exposure to the atmosphere which comprises immersing said lead selenide cell in an alkaline lead sulfide depositing medium to deposit a protective layer of lead sulfide on and in contact with the surface of said lead selenide.

3. The method for producing a lead selenide photosensitive cell resistant to loss of photosensitivity upon exposure to the atmosphere which comprises immersing a glass substrate in an alkaline lead selenide depositing medium to deposit a photosensitive layer of lead selenide on said substrate, removing the substrate from said lead selenide depositing medium and washing said substrate with water, immediately thereafter immersing said substrate containing the photosensitive lead selenide layer in an alkaline lead sulfide depositing medium to deposit a layer of lead sulfide on and in contact with said lead selenide photosensitive layer.

4. A photosensitive lead selenide cell stabilized against loss of photosensitivity upon exposure to the atmosphere comprising a layer of lead selenide deposited on a substrate and a layer of lead sulfide deposited on and in contact with said layer of lead selenide.

5. A photosensitive lead selenide cell stabilized against loss of photosensitivity upon exposure to the atmosphere comprising a layer of lead selenide deposited on a glass substrate and a layer of lead sulfide deposited on said layer of lead selenide, the interface between said layers of lead selenide and lead sulfide being a crystalline mixture of lead selenide and lead sulfide.

References Cited in the file of this patent

UNITED STATES PATENTS 2,742,550     Jenness _____ Apr. 17, 1956

OTHER REFERENCES

Humphrey: Photoconductivity in Lead Selenide, Ph. D. Thesis, University of Maryland, 1955. Publication No. 14,200, University Microfilms, 313 North First St., Ann Arbor, Mich., November 1955, 105 pages.